US009742646B2

(12) United States Patent
Bartlett

(10) Patent No.: US 9,742,646 B2
(45) Date of Patent: *Aug. 22, 2017

(54) SYSTEM AND METHOD FOR MONITORING NETWORK CONNECTION QUALITY BY EXECUTING COMPUTER-EXECUTABLE INSTRUCTIONS STORED ON A NON-TRANSITORY COMPUTER-READABLE MEDIUM

(71) Applicant: Robert Michael Norman Bartlett, West Kelowna (CA)

(72) Inventor: Robert Michael Norman Bartlett, West Kelowna (CA)

(73) Assignee: AAA INTERNET PUBLISHING INC., Kelowna (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/399,303

(22) Filed: Jan. 5, 2017

(65) Prior Publication Data

US 2017/0118097 A1  Apr. 27, 2017

Related U.S. Application Data

(63) Continuation of application No. 14/066,277, filed on Oct. 29, 2013, now Pat. No. 9,571,359.

(60) Provisional application No. 61/720,232, filed on Oct. 30, 2012, provisional application No. 61/719,602, filed on Oct. 29, 2012.

(51) Int. Cl.
H04L 12/26 (2006.01)
H04L 12/24 (2006.01)

(52) U.S. Cl.
CPC .......... H04L 43/08 (2013.01); H04L 41/5009 (2013.01); H04L 43/16 (2013.01)

(58) Field of Classification Search
CPC ...... H04L 43/08; H04L 41/5009; H04L 43/16
See application file for complete search history.

(56) References Cited

U.S. PATENT DOCUMENTS

| 2003/0086425 A1* | 5/2003 | Bearden | H04L 12/2697 370/392 |
| 2004/0100953 A1* | 5/2004 | Chen | H04L 12/2602 370/389 |
| 2006/0153089 A1* | 7/2006 | Silverman | H04L 41/145 370/252 |
| 2010/0269044 A1* | 10/2010 | Ivanyi | G06Q 30/02 715/736 |

* cited by examiner

Primary Examiner — Dustin Nguyen
Assistant Examiner — Javier O Guzman

(57) ABSTRACT

A system and method for monitoring network connection quality utilizes software installed on a user computer to monitor a first network connection to a target server used for a desired activity and a second network connection to a benchmark server. Various network quality metrics are recorded and compared for each of the connections and displayed on a visual display so that the user may easily and accurately judge the health of the connection to the target server.

18 Claims, 11 Drawing Sheets

Software Name

Game Connection Meter ▽  [Continue Test] [Exit]

Game Connection Stat...

| Connection Speed, Strength & Smoothness | Benchmark | Current Connection | % Difference |
|---|---|---|---|
| Average Ping | 67ms | 77ms | 12% |
| Current Ping | 71ms | 81ms | 12% |
| Ping Deviation | 2ms | 12ms | 83% |
| Number of Hops: | 13 | 18 | 27% |
| Number of Bad Hops: | 0 | 11 | 100% |

Your Network Connection Statistics...
Description of the game connection elements and what each represents to connection quality goes here.

FIG. 9

SYSTEM AND METHOD FOR MONITORING NETWORK CONNECTION QUALITY BY EXECUTING COMPUTER-EXECUTABLE INSTRUCTIONS STORED ON A NON-TRANSITORY COMPUTER-READABLE MEDIUM

The current application is a continuation of U.S. patent application Ser. No. 14/066,277 filed Oct. 29, 2013 which claims a priority to the U.S. Provisional Patent application Ser. No. 61/719,602 filed on Oct. 29, 2012, and to the U.S. Provisional Patent application Ser. No. 61/720,232 filed on Oct. 30, 2012.

The current application is a continuation in part of U.S. patent application Ser. No. 14/047,678 filed Oct. 7, 2013 which claims benefit of Provisional Patent Application 61/710,026 filed Oct. 5, 2012.

The current application is a continuation in part of U.S. patent application Ser. No. 14/731,286 filed Jun. 4, 2015 which claims benefit of Provisional Patent Application 62/007,787 filed Jun. 4, 2014.

The current application is a continuation in part of U.S. patent application Ser. No. 14/812,968 filed Jul. 29, 2015 which claims benefit of Provisional Patent Application 62/030,384 filed Jul. 29, 2014.

The current application is a continuation in part of U.S. patent application Ser. No. 15/335,304 filed Oct. 26, 2016 which claims benefit of Provisional Patent Application 62/246,304 filed Oct. 26, 2015.

The current application is a continuation in part of U.S. patent application Ser. No. 15/335,308 filed Oct. 26, 2016 which claims benefit of Provisional Patent Application 62/246,397 filed Oct. 26, 2015.

FIELD OF THE INVENTION

The present invention relates generally to network connections. More specifically, the present invention is a system and method to display the quality of a network connection which evaluates and displays several criteria that influence the quality of a network connection.

BACKGROUND OF THE INVENTION

The quality of a network connection can drastically affect the quality of the activities that are carried out over that network connection. Activities that are especially sensitive to connection quality include gaming and voice communication over IP, or VoIP for short. Online gaming is an extremely common form of recreation in the modern world and can often be very competitive. Competitive gaming is even performed in a professional setting where players vie for position and monetary prizes. In all forms of online gaming, be it recreational or competitive, a good network connection is crucial to the performance of the players. Poor network connection quality can result in performance problems known as lag and rubber banding. In lag, the actions taken by the player are not processed for a noticeable time delay, hence the term lag. Lag is most often caused by high latency between the player's machine and the game server. In rubber banding, the actions that are perceived as taking place by the user do not actually register with the game sever. This can result in the player ending up in a position in the game world they were in several moments ago and had since progressed. This effect can be perceived by players as what appears to be teleportation from point to point as if the player is being pulled around by a rubber band, hence the terminology used to describe this effect. As expected, issues such as lag and rubber banding can have a drastic impact on player performance which can ultimately result in losing the game and much less enjoyment gained from playing the game. VoIP is another activity occurring over network connections that can be greatly affected by a poor network connection. VoIP is a form of communication which allows for communication by voice over the internet. When using VoIP, latency issues can make it difficult for participants in a conversation to communicate effectively, causing unnecessary delays that can result in participants unintentionally talking over each other. Additionally, packet loss can result in poor communication quality which can make it difficult for participants to understand each other. These issues can make it very difficult to communicate using VoIP.

It comes as no surprise that many gamers playing online games also use VoIP to communicate with other players to form and carry out complex strategies and plans. When a poor network connection is being used, both the actions of the gamer in the game and the communication with other players can be completely scrambled. When this happens, the gaming experience suffers and the game becomes barely worth playing as little enjoyment is gained. There are ways to fix and or bypass poor network connections to ensure that the connection problems as described earlier are not suffered by the gamer, however common knowledge dictates this fact; if the problem cannot be identified, then it cannot be solved.

Many games and VoIP programs incorporate a built in latency or ping meters that displays the latency value of the network connection to the user. These ping meters can assist a user in determining when a problem is being caused by the network connection. Unfortunately, as effective as such meters are at displaying latency, they suffer from several major flaws. The first and foremost of those flaws is the fact that almost all ping meters incorporated into games and other applications only display the instantaneous value for the latency of the connection. What this means is that, at any given moment, the latency displayed by the ping meter is the latency experienced by the last packet of data sent by the game to the game server. Because of this, the latency as displayed by the ping meter fluctuates over time, and so the reading on the ping meter at any given time is not an accurate representation of the quality of the network connection being used for that activity. The second problem of such ping meters is the simple fact that they only keep track of one particular metric; latency. Unfortunately, the quality of the network connection can be influenced by metrics other than an instantaneous latency score such as the latency deviation, the number of hops between sender and destination, and packet loss experience. Such metrics can be very telling about the overall quality of a network connection and they are not displayed by ping meters.

It is an object of the present invention to create a network connection quality meter that solves the issues discussed above. The present invention solves the issues discussed above by tracking latency of a network connection over time as well as other performance metrics such as number of hops and packet loss. Additionally, it is an object of the present invention to use a system that enables comparison between the network connection currently being utilized and a benchmark connection. Through this set up, a user is able to see how poor their network connection is when compared to a benchmark connection. Implementing the present invention may help a user identify network connection problems and determine how to correct or bypass those problems, ultimately improving the experience of performing online activities such as gaming and VoIP over network connections.

BRIEF DESCRIPTION OF THE DRAWINGS

FIG. 9 is a mock up of how the visual display of the present invention may look.

DETAIL DESCRIPTIONS OF THE INVENTION

All illustrations of the drawings are for the purpose of describing selected versions of the present invention and are not intended to limit the scope of the present invention.

The present invention is a system and method for monitoring the quality of an internet network connection. This helps a user or an internet service provider (ISP) to diagnose and fix problems with an internet connection that result in bad performance of the connection.

Figure 6:
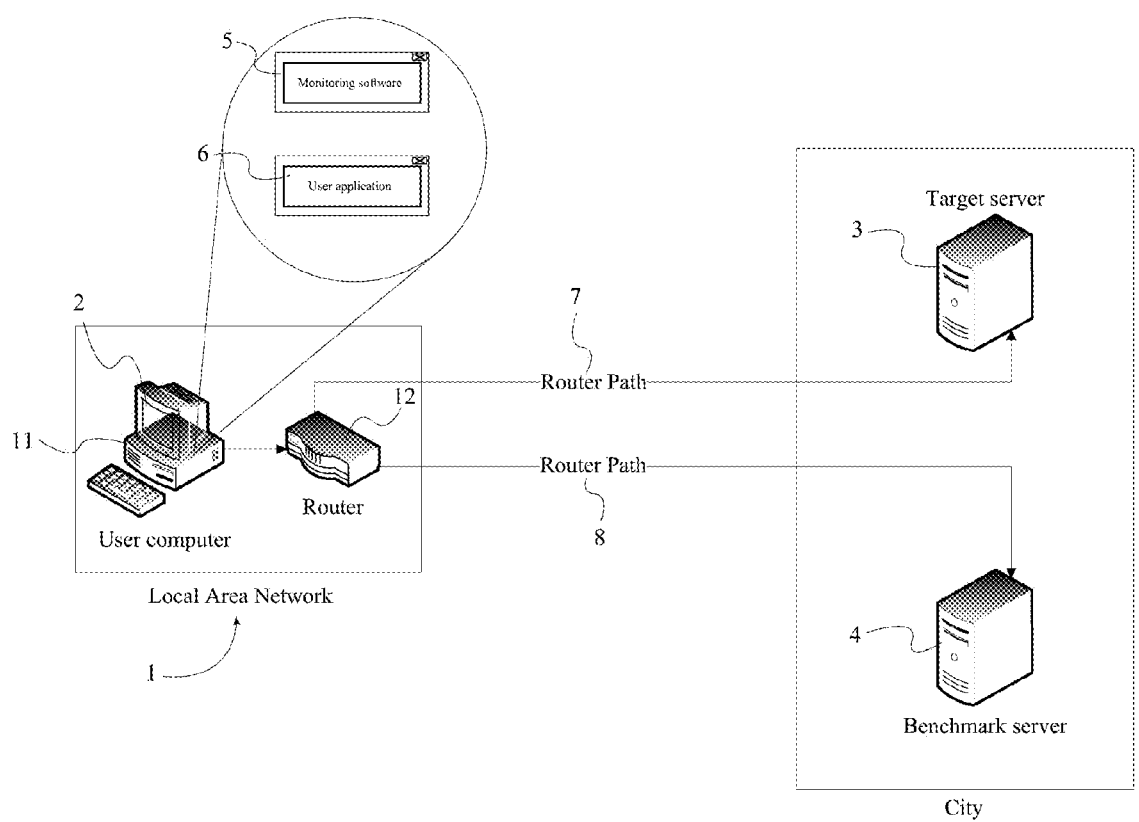
FIG. 6 is a visual flowchart depicting how the benchmark server may be set up.

As illustrated in FIG. 6, in the preferred embodiment of the present invention, the system comprises a local area network 1, a visual display 2, a target server 3, a benchmark server 4, monitoring software 5, and a user application 6. The user application 6 is a game, VoIP application, or another application which depends on a network connection to a remote server. The local area network 1 is electronically connected to the target server 3 and to the benchmark server 4. The local area network 1 comprises a user computer 11 and a router 12, which are electronically connected to each other. The monitoring software 5 and the user application 6 are installed on the user computer 11. The router 12, and thereby the user computer 11, is electronically connected to the target server 3 by a first network connection 7, and is electronically connected to the benchmark server 4 by a second network connection 8.

Figure 7:
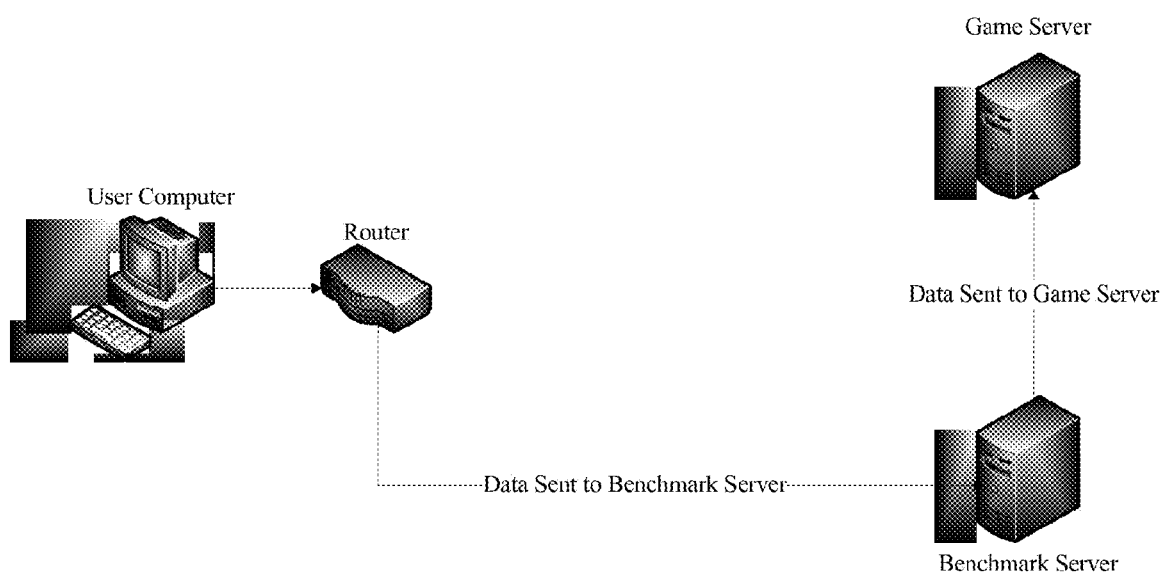
FIG. 7 is a visual flowchart depicting how a round trip may be used to determine the latency difference between the game server and the benchmark server.
Figure 8:
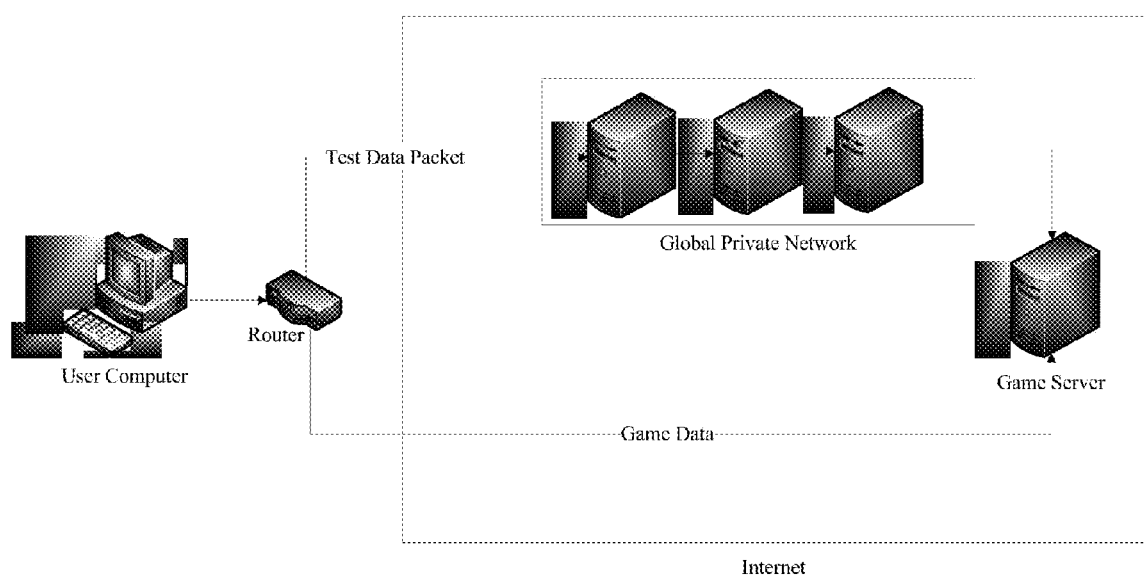
FIG. 8 is a visual flowchart depicting how a chained server connection or global private network can be used to compare values of the five elements to help determine the quality of the network connections.

The benchmark server 4 should be physically positioned such that the benchmark server 4 is near the target server 3 of internet data sent and received by the user application 6. This enables a comparison test to be made from the user's computer as a network connection is simultaneously made to both the target server 3 and the benchmark server 4. It is important that the benchmark server 4 be located in the same city as the target server 3 but that the benchmark server 4 is in a different data center. If the benchmark and the target server 3 are in the same data center, then almost no difference would be present between recorded values of network connection quality for network connections to each server. Additionally, the fact that the benchmark sever and the target server 3 are close together but still potentially several milliseconds apart enables another ping to be made between the benchmark server 4 and the target server 3. Granted that the benchmark sever is either a proxy or a virtual private network, an accurate calculation of a roundtrip taken by data may be determined; the roundtrip being data sent from the user, to the proxy server, and then to the target server 3. It is important to note that this comparison system could also be implemented with a private server system that is comprised of a plurality of servers across the globe, as illustrated in FIGS. 7 and 8. In this fashion, comparison may be made between round trip values of network connection quality for data sent through the private server system and data that is sent normally through regular network connections. In this way, comparisons may be made that show the impact on quality that is experienced when the private server system is used as opposed to allowing the internet data to be sent regularly through internet routers.

The monitoring software 5 is the central component of the present invention, and continually monitors and records one or more first network quality metrics for the first network connection 7 and one or more second network quality metrics for the second network connection 8. Network quality metrics are various elements relevant to measuring the quality of a network connection.

In the preferred embodiment of the present invention, the network quality metrics include, but are not limited to, current ping, average ping, ping deviation, number of hops, number of bad hops, and flux. The ping deviation and average ping elements are based upon historical data recorded by the monitoring software 5 over the course of the online activity. The average ping element is based upon recorded values of the current ping. Ping deviation is based upon maximum and minimum values of the current ping as recorded by the monitoring software 5. Number of hops is defined as the number of routers internet data must travel through before reaching the destination server. A higher number of hops can mean higher latency and higher chances of experiencing packet loss that can result from bad hops. The number of bad hops is defined as the number of hops that take place which cause internet data to experience packet loss or high latency deviation. Bad hops can be the primary cause of high latency deviation and rubber banding, both of which are highly detrimental to online gaming. Flux is defined in regards to the present invention as the number of average ping spikes, or lag, minus the average latency.

The monitoring software 5 continually compares the one or more first network quality metrics and the one or more second network quality metrics. This data provides the user with a great deal of information on the overall quality of the network connection they are using to perform their online activities, and is saved such that it can be viewed later by the user, or alternatively may be reported to a central database server for analysis by an administrator. Although the values of the network quality metrics are telling about the quality of the network connection, it is much more meaningful to have control or benchmark values to which comparisons may be made. For this purpose, the monitoring software 5 also monitors and records network quality metrics for the second network connection 8 to the benchmark server 4. This allows for comparison between the network quality metrics of the first network connection 7 being used by the online activity and the second network connection 8 to the benchmark server 4.

Figure 10:
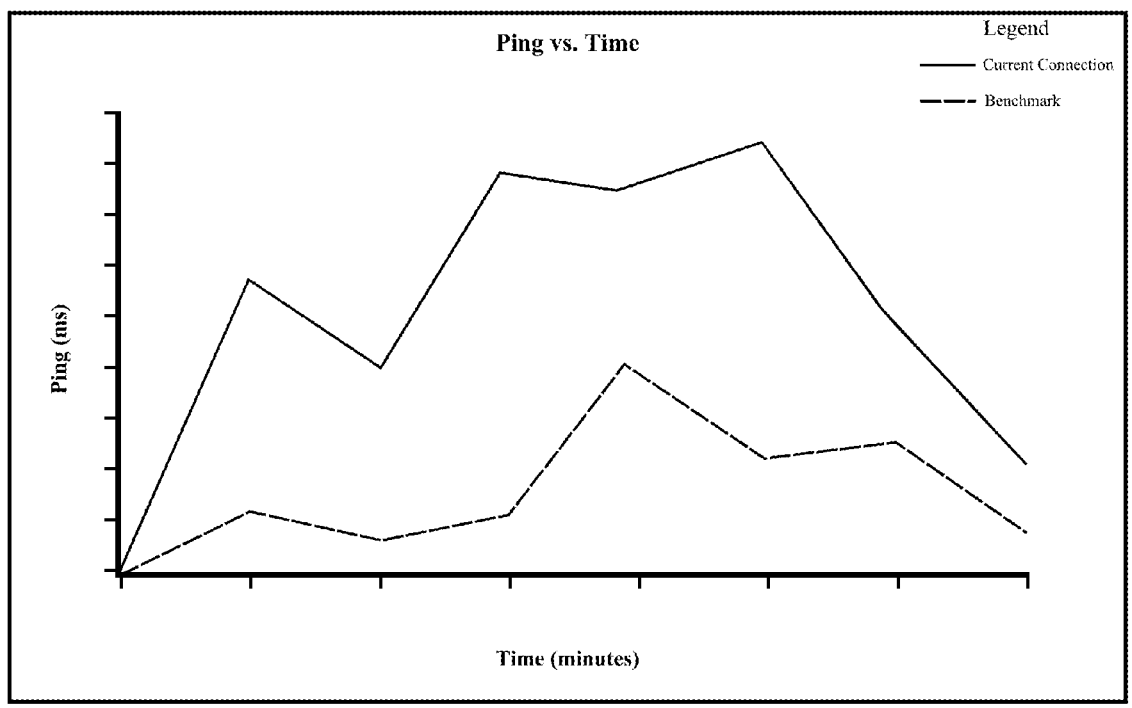
FIG. 10 is a mock up of how one of the five elements may be graphically displayed.
Figure 11:
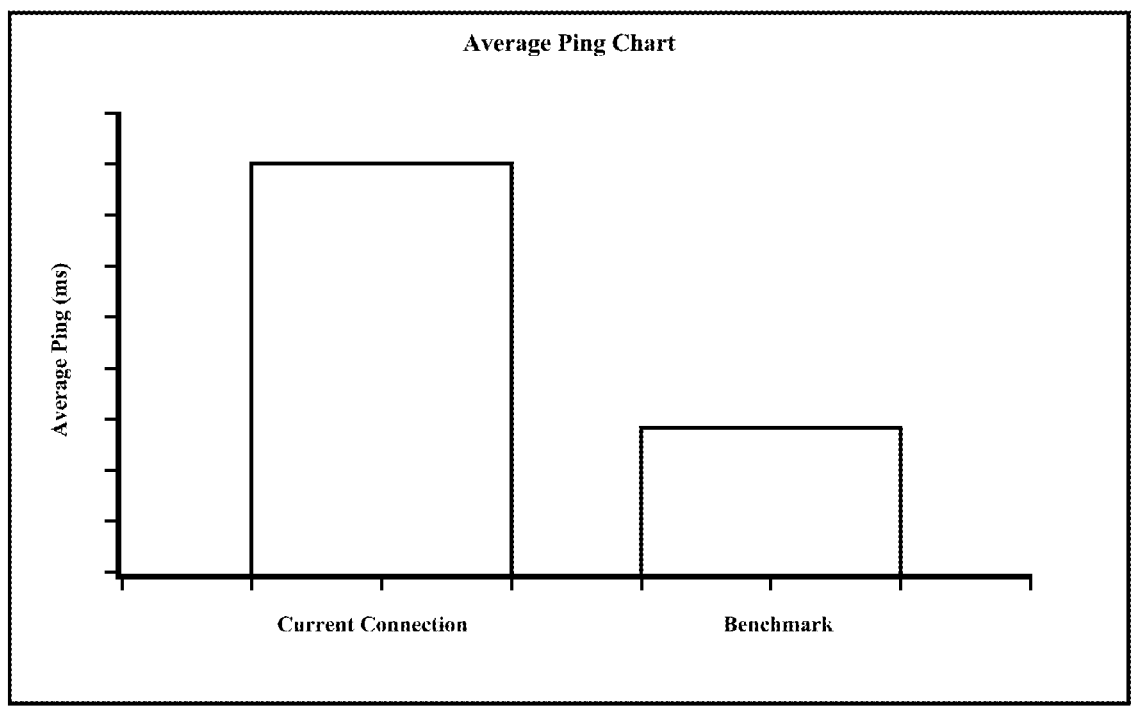
FIG. 11 is a mock up of how another one of the five elements may be graphically displayed.

Comparison between the two sets of values is facilitated by the visual display 2. The visual display 2 can show the one or more first network quality metrics and the one or more second network quality metrics side by side or in any other configuration that is conducive to comparison between them. The monitoring software 5 displays at least one of the one or more first network quality metrics on the visual display 2, and preferably displays at least one of the one or more second network quality metrics, wherein each of the at least one of the one or more first network quality metrics corresponds to one of the at least one of the one or more second network quality metrics. Thus, the quality of the first network connection 7 may easily be visually compared to the quality of the second network connection 8. Various embodiments of the visual display can be seen in FIGS. 9-11.

In the preferred embodiment of the present invention, the visual display 2 of the monitoring software 5 can be accessed by the user at any time and allows the user to view current values of network quality metrics as recorded and calculated by the monitoring software 5. It should be noted that the monitoring software 5 may be its own standalone application that is installed onto the user computer 11 and configured to monitor various network connections used by specific applications such as games and VoIP programs. Alternatively, the monitoring software 5 may be incorporated into pre existing applications, like games and VoIP programs, as a system that can be quickly and easily accessed by the user without having to minimize the user application 6 while performing the online activity.

The visual display 2 may additionally incorporate features for advanced data viewing and benchmark comparison, such as, but not limited to, a graphical display of one or more of the network quality metrics over the time during which the online activity is being carried out.

Referring to FIGS. 1-4, the method of the present invention is as follows. In the preferred embodiment of the present invention, a target server 3 and a benchmark sever are provided, as well as a database and a visual display 2. A first network connection 7 is established to the target server 3, and a second network connection 8 is established to the benchmark server 4. One or more first network quality metrics are monitored by the monitoring software 5 for the first network connection 7, and one or more second network quality metrics are monitored by the monitoring software 5 for the second network connection 8. Each of the one or more second network quality metrics corresponds to one of the one or more first network quality metrics; that is, each of the one or more first network quality metrics is the same as one of the one or more second network quality metrics, but measured for a different network connection.

The one or more first network quality metrics and the one or more second network quality metrics are stored within the database. Then, at least one of the one or more first network quality metrics and at least one of the one or more second network quality metrics are retrieved from the database and displayed on the visual display 2. The user may customize which of the network quality metrics are displayed on the visual display 2. To this end, at least one metric selection is received from the user through the monitoring software 5, wherein each of the at least one metric selection corresponds to one of the one or more first network quality metrics and to one of the second network quality metrics, wherein the one of the one or more first network quality metrics corresponds to the one of the one or more second network quality metrics. Each of the at least one metric selection is displayed on the visual display 2.

The monitoring software 5 compares the one or more first network quality metrics to the one or more second network quality metrics. That is, the first network connection 7 to the target server 3 is continually compared to the second network connection 8 to the benchmark server 4. To facilitate diagnosing bad connections, the monitoring software 5 is capable of being configured to trigger an alert if at least one of the one or more first network quality metrics crosses an acceptable threshold. The alert may be an audio or visual alert on the user computer 11, or the alert may be embodied in the form of an electronic message that is sent to an ISP, network administrator or another relevant entity.

Alternatively or additionally, a network quality report may be generated using the one or more first network quality metrics and the one or more second network quality metrics, and the network quality report is then sent to an ISP, system administrator or another relevant entity. The network quality report is preferably formatted such that the network quality report may be conveniently sent to a local internet service provider. The network quality report can be especially helpful in identifying problem routers that are affecting a wide range of outgoing internet traffic due to close proximity to the origin of the traffic. Using this, problems only solvable by the internet service provider can be identified and brought to their attention such that action can be taken to correct said problems.

The present invention may be utilized with multiple services or applications on the user computer 11. To this end, additional network connections to additional target server 3s may be monitored and compared to the second network connection 8 to the benchmark server 4, or to additional benchmark server 4s as needed if different applications connect to target server 3s in significantly distinct locations.

Figure 1:
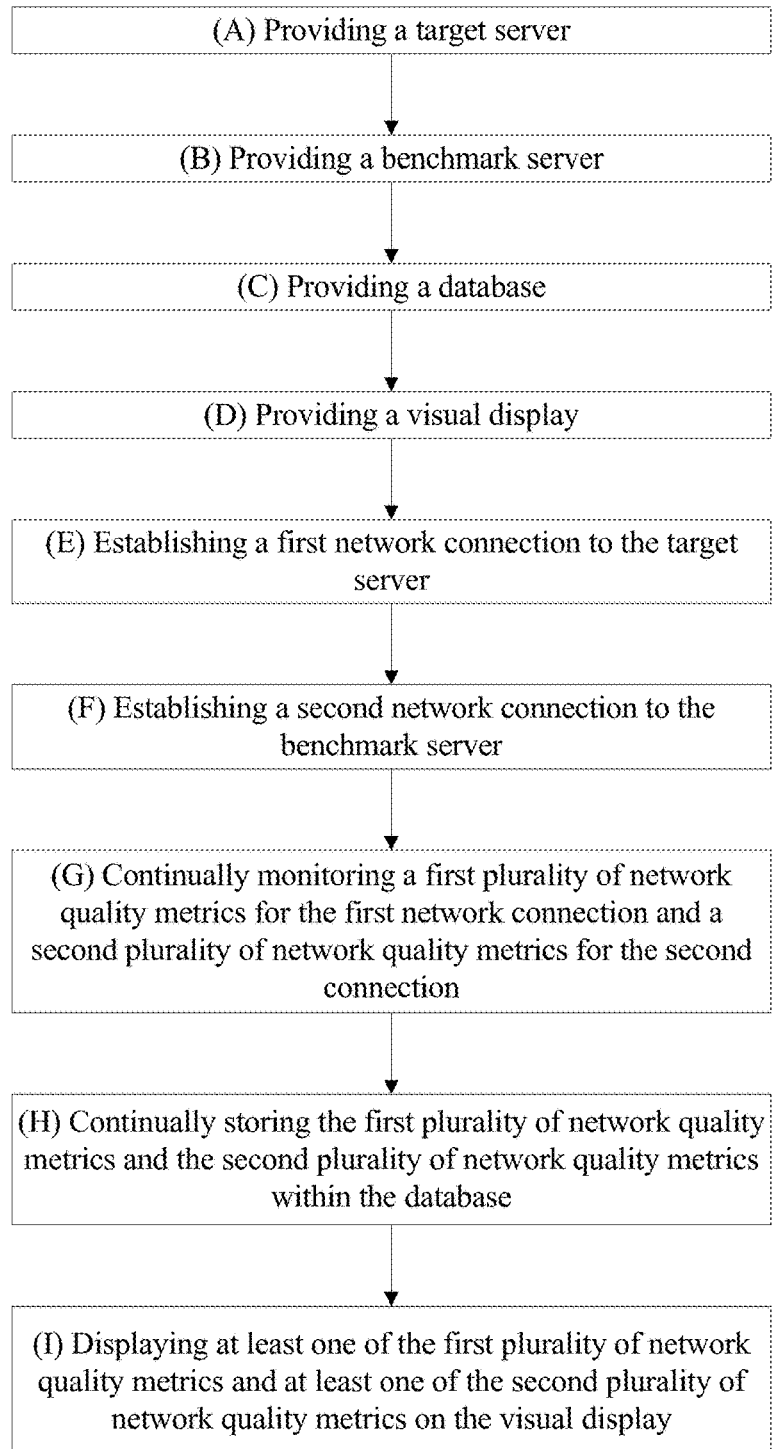
FIG. 1 is a flowchart describing the main steps of the method of the present invention.
Figure 2:
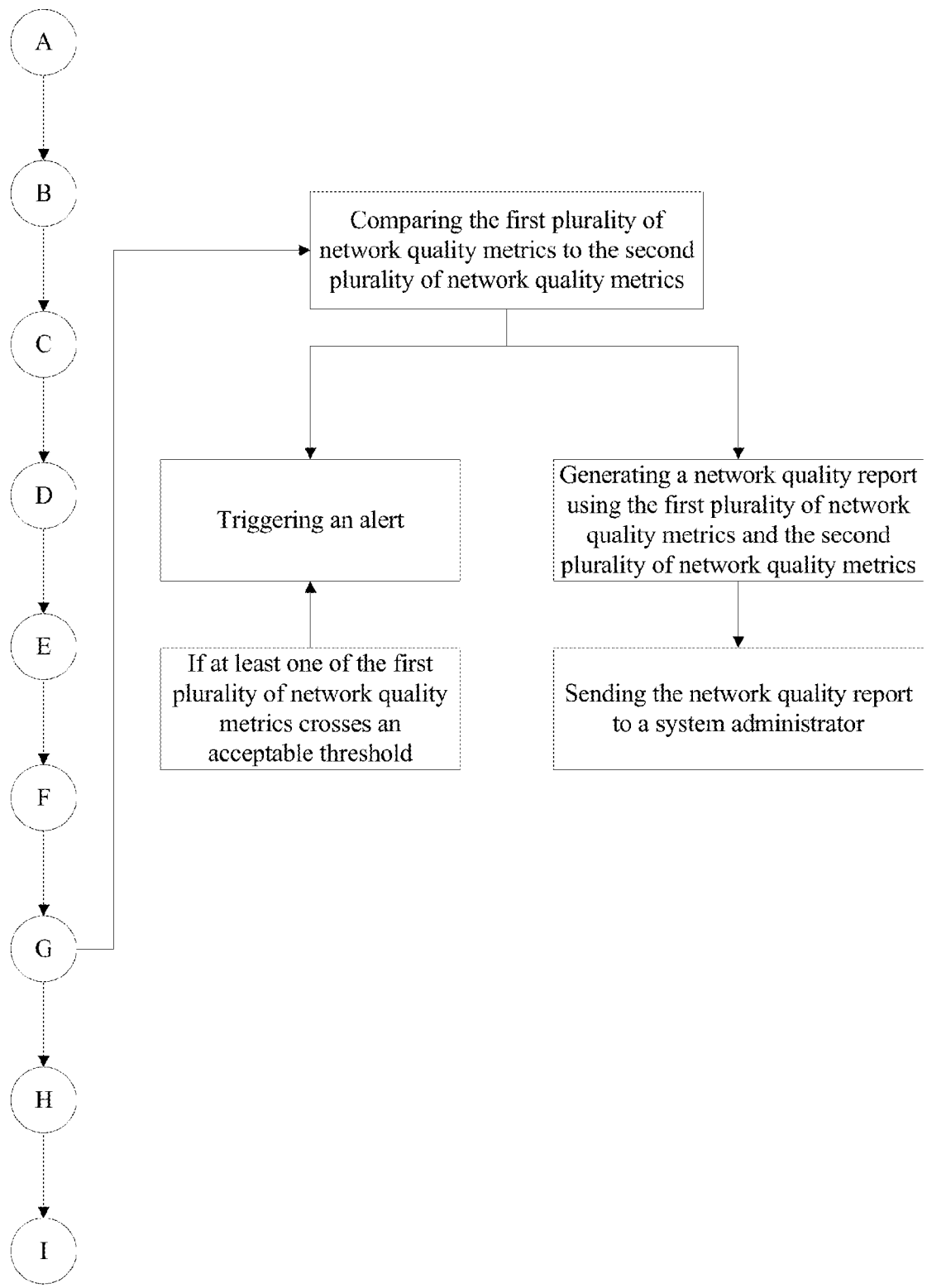
FIG. 2 is a flowchart describing additional steps in the method of the present invention for comparing a network connection to a benchmark connection.
Figure 3:
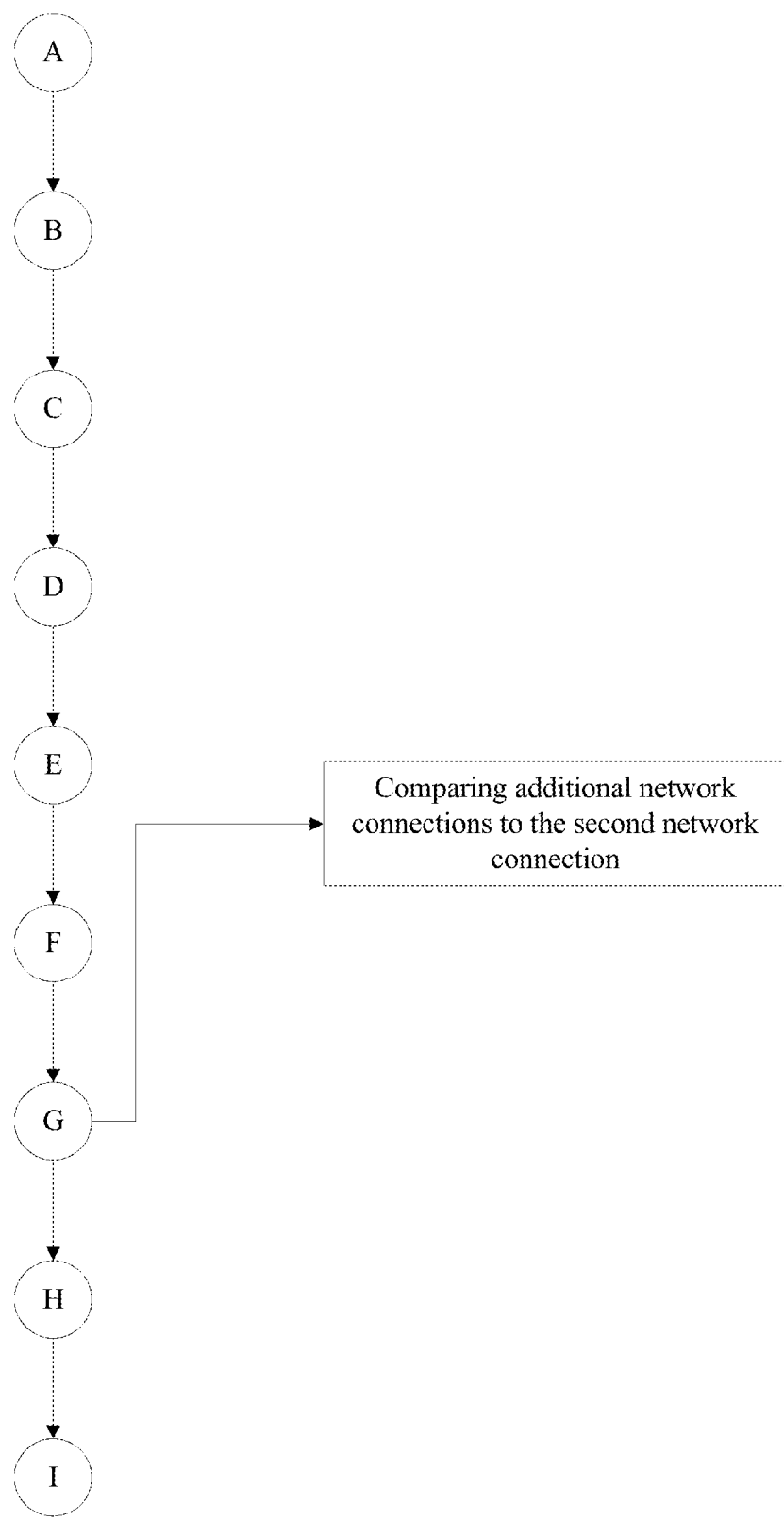
FIG. 3 is a flowchart describing an additional embodiment where multiple network connections are monitored.
Figure 4:
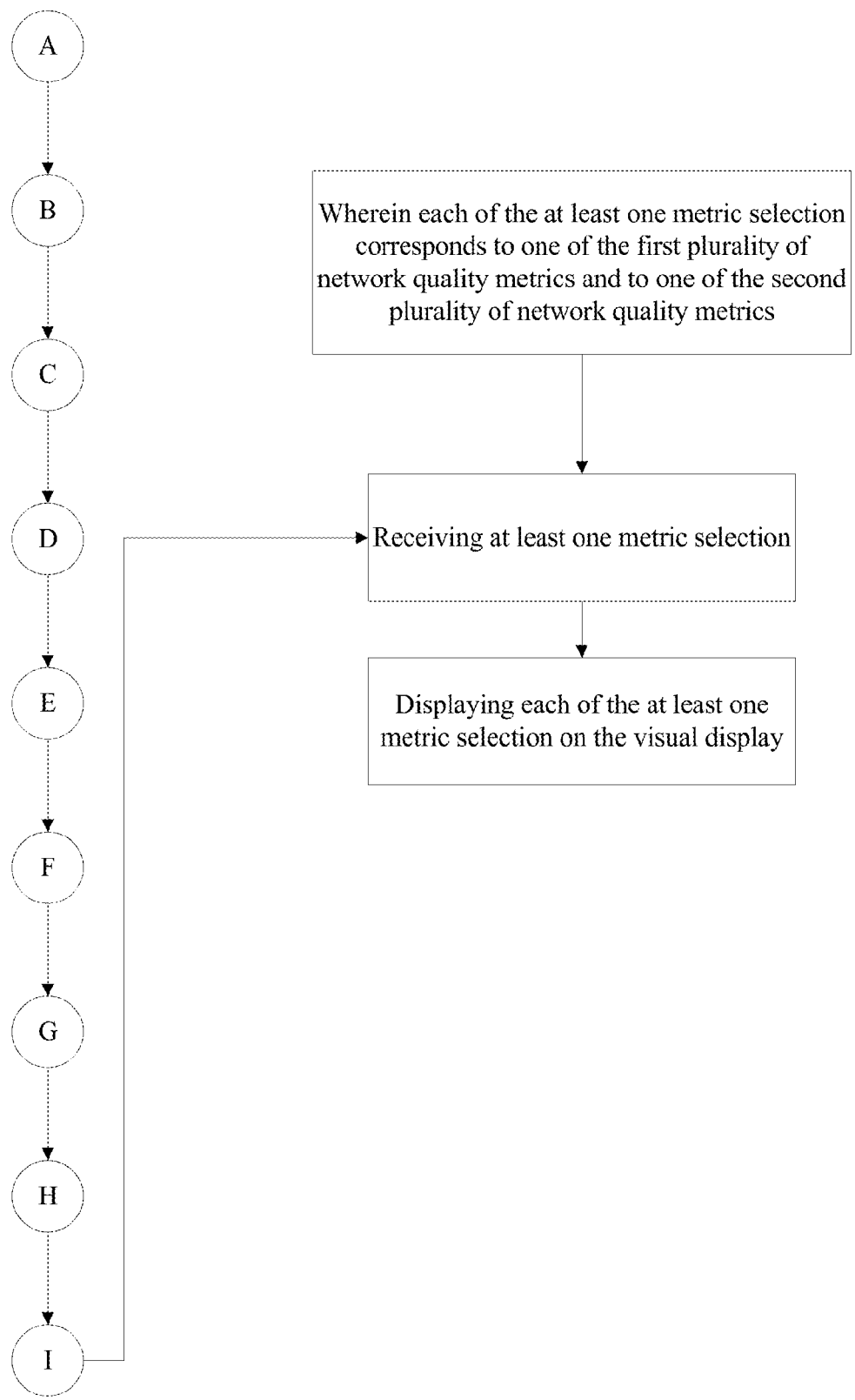
FIG. 4 is a flowchart describing steps for customizing the visual display.
Figure 5:
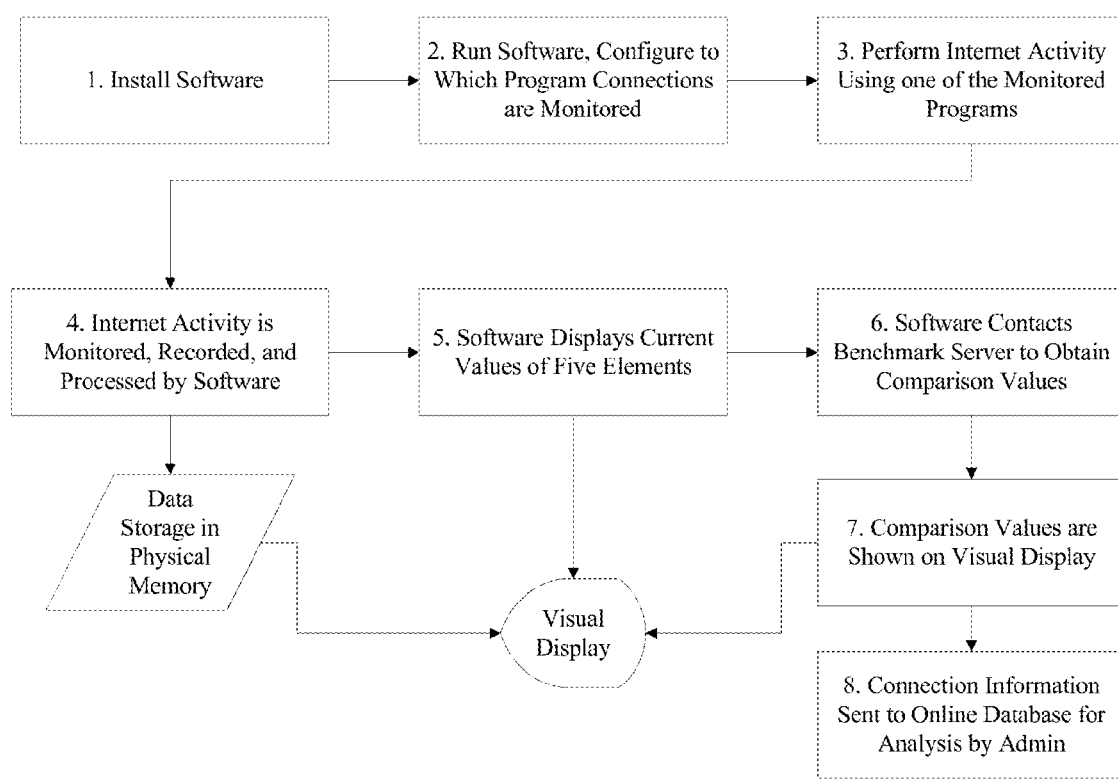
FIG. 5 is a flowchart describing the basic steps followed by the method of the present invention.

As illustrated in FIG. 5, another perspective of the process of using the present invention is as follows.

Step one; the user installs the monitoring software 5 onto the user computer 11 on which the user intends to perform online activities such as gaming and VoIP communication.

Step two; the user runs the monitoring software 5 and chooses what programs on the user computer 11 for which the user wants the monitoring software 5 to track network connections. Alternatively, the monitoring software 5 may be pre configured to track network connections for specific programs, or the monitoring software 5 may be pre configured to integrate with certain programs that are already present on the computer.

Step three; the user performs internet activity with one of the programs that is set to be tracked by the monitoring software 5. The internet activity is performed over the first network connection 7 to the target server 3.

Step four; the internet activity is monitored and recorded by the monitoring software 5. The network quality metrics described above are key values that are monitored and recorded by the monitoring software 5.

Step five; the monitoring software 5 analyzes values collected for the one or more first network quality metrics and generates whatever values that are based on historical information such as average ping and ping deviation.

Step six; the monitoring software 5 collects and generates values for the one or more second network quality metrics through the second network connection 8 to the benchmark server 4. The one or more second network quality metrics is used for comparison to the one or more first network quality metrics.

Step seven; all or some of the information collected and generated by the monitoring software 5 is displayed to the user through the visual display 2, which organizes the information into a format that is concise and easy for even a non technical user to understand. The visual display 2 may be either a separate application from the program performing the internet activity, or it may be brought into the program as an overlay. Using the information provided in the visual display 2, the user can act accordingly in response to the level of quality the first network connection 7 is providing.

Step eight; information collected and generated by the monitoring software 5 may be reported to an online database for centralized collection and review for many users and analysis of network results by region or Internet/backbone provider. The information may alternatively be reported to another appropriate entity such as a system or network administrator.

Although the invention has been explained in relation to its preferred embodiment, it is to be understood that many other possible modifications and variations can be made without departing from the spirit and scope of the invention as hereinafter claimed.

What is claimed is:

1. A method for monitoring network connection quality by executing computer-executable instructions stored on a non-transitory computer-readable medium, the method comprising:
   providing a target server;
   providing a database;
   providing a visual display;
   establishing a first network connection to the target server;
   continually monitoring one or more first network quality metrics for the first network connection;
   continually storing the one or more first network quality metrics within the database;
   retrieving at least one of the one or more first network quality metrics from the database;
   displaying the at least one of the one or more first network quality metrics on the visual display;
   providing a private server system;
   establishing an additional network connection to the target server through the private server system;
   continually monitoring one or more second network quality metrics for the additional network connection, each of the one or more second network quality metrics corresponding to one of the one or more first network quality metrics;
   continually storing the one or more second network quality metrics within the database;
   retrieving at least one of the one or more second network quality metrics from the database;
   displaying the at least one of the one or more second network quality metrics on the visual display;
   simultaneously monitoring the one or more first network quality metrics for the first network connection and the one or more second network quality metrics for the additional network connection;
   the first network quality metrics being at least one member of the group consisting of a first current ping, a first average ping, a first ping deviation, number of first hops, number of first bad hops, a first flux, number of first ping spikes, and number of first packet loss, and any other network quality metric;
   and the second network quality metrics being at least one member of the group consisting of a second current ping, a second average ping, a second ping deviation, number of second hops, number of second bad hops, a second flux, number of second ping spikes, and number of second packet loss, and any other network quality metric.

2. The method of claim 1 further comprising:
   the private server system comprising a plurality of proxy servers.

3. The method of claim 1 further comprising:
   triggering an alert when the at least one of the one or more first network quality metrics crosses an acceptable threshold.

4. The method of claim 3 further comprising:
   the alert being of an audio form.

5. The method of claim 3 further comprising:
   the alert being of a visual form.

6. The method of claim 1 further comprising:
   generating a network quality report by using the one or more first network quality metrics and the one or more second network quality metrics.

7. The method of claim 6 further comprising:
   sending the network quality report to a system administrator.

8. The method of claim 1 further comprising:
   receiving at least one metric selection in response to continually comparing the one or more first network quality metrics with the one or more second network quality metrics; and
   corresponding each of the at least one metric selection to one of the one or more first network quality metrics and to one of the one or more second network quality metrics.

9. The method of claim 8 further comprising:
   displaying each of the at least one metric selection on the visual display.

10. A system for monitoring network connection quality comprising:
    a local area network comprising a user computer and a router, the user computer being electronically connected to the router;
    a monitoring software installed on the user computer;
    a user application installed on the user computer;
    a target server;
    a database;
    a visual display;
    a first network connection, the router being electronically connected to the target server by the first network connection;
    a one or more first network quality metrics for the first network connection, the one or more first network quality metrics being continually monitored by the monitoring software, the one or more first network quality metrics being continually stored within the database, at least one of the one or more first network quality metrics being retrieved from the database, the at least one of the one or more first network quality metrics being displayed on the visual display by the monitoring software;
    a private server system;
    an additional network connection, the router being electronically connected to the target server by the additional network connection through the private server system;
    a one or more second network quality metrics for the additional network connection, the one or more second network quality metrics being continually monitored by the monitoring software, each of the one or more second network quality metrics corresponding to one of the one or more first network quality metrics, the one or more second network quality metrics being continually stored within the database, at least one of the one or more second network quality metrics being retrieved from the database, the at least one of the one or more second network quality metrics being displayed on the visual display by the monitoring software;

the one or more first network quality metrics for the first network connection and the one or more second network quality metrics for the additional network connection being simultaneously monitored;

the first network quality metrics being at least one member of the group consisting of a first current ping, a first average ping, a first ping deviation, number of first hops, number of first bad hops, a first flux, number of first ping spikes, and number of first packet loss, and any other network quality metric;

and the second network quality metrics being at least one member of the group consisting of a second current ping, a second average ping, a second ping deviation, number of second hops, number of second bad hops, a second flux, number of second ping spikes, and number of second packet loss, and any other network quality metric.

11. The system of claim 10 further comprising:
the private server system comprising a one or more first proxy servers.

12. The system of claim 10 further comprising:
an alert triggered by the monitoring software when the at least one of the one or more first network quality metrics crosses an acceptable threshold.

13. The system of claim 12 further comprising:
the alert being of an audio form transmitted from the user computer.

14. The system of claim 12 further comprising:
the alert being of a visual form transmitted from the user computer.

15. The system of claim 10 further comprising:
a network quality report generated by using the one or more first network quality metrics and the one or more second network quality metrics.

16. The system of claim 15 further comprising:
the network quality report being sent to a system administrator.

17. The system of claim 10 further comprising:
at least one metric selection received in response to continually comparing the one or more first network quality metrics with the one or more second network quality metrics by the monitoring software; and
each of the at least one metric selection corresponding to one of the one or more first network quality metrics and to one of the one or more second network quality metrics.

18. The system of claim 17 further comprising:
each of the at least one metric selection being displayed on the visual display.

\* \* \* \* \*